United States Patent [19]

Shulman et al.

[11] Patent Number: 4,673,620

[45] Date of Patent: Jun. 16, 1987

[54] ELASTOMERIC THERMOPLASTIC LOW VOLTAGE INSULATION ON CONDUCTIVE SUBSTRATE

[75] Inventors: Cindy B. Shulman, Cliffside Park; Lawrence Spenadel, Westfield, both of N.J.

[73] Assignee: Exxon Research & Engineering Co., Florham Park, N.J.

[21] Appl. No.: 910,880

[22] Filed: Sep. 24, 1986

Related U.S. Application Data

[63] Continuation of Ser. No. 584,158, Feb. 27, 1984, abandoned.

[51] Int. Cl.$^4$ .............................................. B32B 15/00
[52] U.S. Cl. .................................... 428/379; 428/390; 428/500; 428/521; 428/523
[58] Field of Search ............... 428/379, 390, 500, 521, 428/523

[56] References Cited

U.S. PATENT DOCUMENTS

| | | | |
|---|---|---|---|
| 3,941,859 | 3/1976 | Batiuk et al. | 260/897 |
| 3,951,871 | 4/1976 | Lloyd et al. | 252/511 |
| 4,210,579 | 7/1980 | Grigo et al. | 525/88 |
| 4,212,787 | 7/1980 | Matsuda et al. | 525/232 |

OTHER PUBLICATIONS

Hackh's, "Chemical Dictionary", Fourth Edition, pp. 518.
Hawley, "The Condensed Chemical Dictionary", Tenth Edition, pp. 293.

*Primary Examiner*—Marion C. McCamish
*Attorney, Agent, or Firm*—H. L. Cohen

[57] ABSTRACT

Nonvulcanized, thermoplastic elastomeric compositions useful in high quality, low voltage insulation. The compositions comprise polyolefin plastics blended with a copolymer of ethylene and an unsaturated ester of a lower carboxylic acid, olefinic elastomer and mineral filler and/or carbon black filler, and, optionally, hydrocarbon oil. Preferably the filler is alumina trihydrate which results in a flame-retardant insulation useful in building and communication wire.

14 Claims, No Drawings

ELASTOMERIC THERMOPLASTIC LOW VOLTAGE INSULATION ON CONDUCTIVE SUBSTRATE

This is a continuation of application Ser. No. 584,158, filed Feb. 27, 1984, now abandoned.

BACKGROUND OF THE INVENTION

This invention relates generally to the field of elastomer plastics blends or blends of polyolefin plastics with olefinic elastomers, mineral and/or carbon black fillers and, optionally, hydrocarbon process oil, process aids, etc. Specifically, it is directed to blends of polyolefin plastics such as polypropylene, polypropylene reactor copolymer, polybutylene, linear low density polyethylene, and high density polyethylene with a copolymer of ethylene, olefinic elastomer, mineral and/or carbon black filler, and, optionally, hydrocarbon process oil, process aids, polymer-filler coupling agents, antiblock additives, antioxidants, pigments, foaming agents, etc. More specifically, it is directed to compositions comprising blends of polypropylene, ethylene-propylene copolymer or terpolymer elastomer, ethylene-vinyl acetate copolymer and mineral filler, e.g., alumina trihydrate. The compositions can be used as insulation on wire for low voltage applications without the necessity for vulcanization. The compositions exhibit good retention of properties after heat aging and, where the appropriate mineral filler is used, excellent flame retardant properties.

Blends similar to those described herein are disclosed in copending U.S. patent application Ser. No. 362,103, filed Mar. 26, 1982. The similarities relate primarily to the polymeric components, however, polyethylene is not specifically recommended for use in the blends herein. Furthermore, the blend compositions disclosed and claimed herein utilize mineral and/or carbon black fillers as an integral part of the composition and treat hydrocarbon process oil as an optional ingredient. In a significant point of departure, the invention disclosed herein is an insulated, electrically conductive substrate wherein the blend composition is employed as the insulating member; the reference did not recognize that similar blends could be developed which would have the advantageous and useful properties and uses disclosed herein. The disclosure of U.S. patent application Ser. No. 362,103 is incorporated herein by reference.

It is well known that a polyolefin such as polyethylene can be employed by itself or in blends with other polymers to produce electrically insulating compositions. However, such compositions are typically vulcanized, see, e.g., U.S. Pat. No. 3,433,891 and U.S. Pat. No. 4,322,575. The compositions disclosed in these prior art references are not thermoplastic since they are vulcanized compositions. Furthermore, they fail to describe the particular blend of ingredients taught herein, the latter resulting in the advantageous structures disclosed.

U.S. Pat. No. 4,303,571 teaches the preparation of a film forming blend composition comprising ethylene-propylene elastomers, ethylene-vinyl acetate copolymers and a hydrocarbon oil plasticizer. However, the reference does not recognize that such a composition can be advantageously blended with polyolefin plastics nor, that mineral and/or carbon black fillers are required and that the compositions are specifically useful as electrical insulation.

Compositional differences also distinguish the instant invention from other references disclosing thermoplastic elastomer compositions, for example Japanese Kokai to Sumitomo Chemical, No. 77 126,450 and Japanese Kokai to Mitsui Petrochemical, No. 80 71, 739. The former reference discloses a modified copolymer rubber composition for use in extruded and molded articles. Additionally, the compositions of the latter reference are intended to be treated with a peroxide crosslinking agent.

SUMMARY OF THE INVENTION

In accordance with the present invention, improved insulated, electrically conductive substrates have been discovered wherein the insulation is a nonvulcanized, thermoplastic elastomeric blend composition. The composition is useful in the production of high quality, low voltage insulation, e.g. building and communication wire. The blend comprises (a) polyolefin plastics such as polypropylene, polypropylene reactor copolymer, polybutylene, linear low density polyethylene, high density polyethylene or mixtures thereof (b) a copolymer of ethylene and an unsaturated ester of a lower carboxylic acid, (c) olefinic elastomer, and (d) mineral filler and/or carbon black filler and, optionally, hydrocarbon oil.

DESCRIPTION OF THE PREFERRED EMBODIMENTS

Polyolefin plastics useful in this invention include polypropylene, which can be a highly crystaline isotactic or syndiotactic polypropylene. Also, the polypropylene may be a copolymer, referred to as a polypropylene reactor copolymer, either random or block copolymer, containing minor amounts of an alpha-olefin comonomer of 2 to 16 carbon atoms. The level of comonomer which can be utilized is about 1 to about 20 weight percent, preferably about 2 to about 18, most preferably about 2 to about 15; a preferred comonomer is ethylene. The density of polypropylene can be from about 0.900 to about 0.906 g/cc. High density polyethylene (HDPE) useful as the polyolefin plastic has a density of about 0.941 to about 0.965 g/cc. High density polyethylene is an established product of commerce and its manufacture and general properties are well known in the art. Typically, HDPE has a relatively broad molecular weight distribution, characterized by the ratio of weight averge to number average molecular weight, of from about 20 to 40. Some useful grades of HDPE have a melt index (ASTM D1238, Method E) of from about 0.03 to about 5.0 g/10 min. and a density of from about 0.941 to about 0.965 g/cc.

Polybutylene, also useful in this invention as the polyolefin plastic component, is a term which generally refers to both poly (1-butene) homopolymer and the copolymer with, e.g., ethylene, propylene, pentene-1, etc. Particularly useful in this invention is the ethylene copolymer. Polybutylene is manufactured via stereospecific Ziegler-Natta polymerization of the monomer(s). Commercially useful products are of high molecular weight and isotaticity. A variety of commercial grades of both homopolymer and ethylene copolymer are available with melt indices that range from about 0.3 to about 20 g/10 min.; commercial ethylene copolymer grades have a melt index of from about 1 to about 2, although it is to be expected that a wider range would be acceptable, e.g., from about 0.5 to about 5 or higher, depending on the intended application.

Linear low density polyethylene (LLDPE) is a relatively new class of low density polyethylene characterized by little, if any, long chain branching, in contrast to conventional low density polyethylene. The processes for producing LLDPE are well known in the art and commercial grades of this polyolefin plastic are available. Generally, it is produced in gas-phase fluidized bed reactors or liquid-phase solution process reactors; the former process can be carried out at pressures of about 100 to 300 psi and temperatures as low as 100° C. Polymers can be made in the gas phase with melt indices and densities over the full commercial range and with molecular weight distributions from very narrow to very broad.

High density polyethylene is also a well known item of commerce and includes polymers with densities of from about 0.941 to about 0.965 g/cc.

Typically, the level of polyolefin plastics employed is from about 10 to about 40 weight percent of the composition, preferably about 12 to about 35 weight percent, most preferably about 14 to about 30 weight percent.

Polyethylene copolymers include copolymers of ethylene with an unsaturated ester of a lower carboxylic acid. In particular, copolymers of ethylene with vinyl acetate or alkyl acrylates, for example, methyl acrylate and ethyl acrylate, are employed. The polyethylene copolymers to be employed generally contain from about 50 to about 99 weight percent ethylene, preferably about 60 to about 95 weight percent ethylene, most preferably about 70 to about 90 weight percent ethylene. The level of polyethylene copolymer employed in the final blend composition is generally from about 10 to about 35 weight percent of the composition, preferably from about 12 to about 30 weight percent, most preferably about 14 to about 25 weight percent.

The olefinic elastomer component of the elastomeric plasticizer can comprise ethylene copolymer elastomers, such as copolymers of ethylene with higher alpha-olefins such as propylene. The ethylene elastomer copolymers for use herein should include between about 30 and about 90 weight percent ethylene, preferably between about 35 and about 80 weight percent ethylene, most preferably between about 50 and about 70 weight percent ethylene. In some cases an oil extended elastomer can be employed in the compositions of this invention. In such case, the composition is adjusted to take account of the oil added by means of the oil extended elastomer as compared to the total amount of oil desired in the final compositon.

It is also within the scope of this invention to employ as the olefinic elastomer an ethylene copolymer elastomer comprising a terpolymer of ethylene, a higher alpha-olefin such as propylene, and a nonconjugated diene (the terpolymer commonly referred to as EPDM). In such elastomers the nonconjugated diolefin may be straight chain, branched chain or cyclic hydrocarbon diolefins having from 6 to 15 carbon atoms, such as the following:

A. straight chain acyclic dienes such as: 1,4-hexadiene; 1,6-octadiene;
B. branched chain acyclic dienes such as: 5-methyl-1,4-hexadiene; 3,7-dimethyl-1,6-octadiene; 3,7-dimethyl-1,7 octadiene and the mixed isomers of dihydro-myrcene and dihydro-ocinene;
C. single ring alicyclic dienes such as: 1,3-cyclopentadiene; 1,4-cyclohexadiene; 1,5-cyclooctadiene; and 1,5-cyclododecadiene;
D. multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene; 5-cyclohexylidene-2-norbornene; 5-vinyl-norbornene; and norbornadiene.

Of the non-conjugated dienes typically used to prepare these copolymers, preferred are dicyclopentadiene, 1,4-hexadiene, 5-methylene-2-norbornene and 5-ethylidene-2-norbornene; 5-ethylidene-2-norbornene (ENB) and 1,4-hexadiene are particularly preferred diolefins. EPDM elastomers and their method of manufacture are now well known to those skilled in the art. Oil extended EPDM elastomers are also within the scope of disclosed EPDM elastomers. Preferred EPDM elastomers contain about 30 to about 90 weight percent ethylene, more preferably about 35 to about 80 weight percent ethylene, most preferably about 50 to about 70 weight percent ethylene, and from about 0.5 to about 15 weight percent nonconjugated diolefin, e.g., ENB.

The olefinic elastomer useful in this invention can also be polyisobutylene, copolymers of isobutylene and isoprene (generally known as butyl rubber) and halogenated copolymers of isobutylene and isoprene (generally known as halogenated butyl rubber, such as chlorinated, brominated and chlorobrominated butyl rubber). Butyl rubber is a vulcanizable rubbery copolymer containing from about 85 to 99.5 percent combined isoolefin having from 4 to 8 carbon atoms and 0.5 to 15 percent combined conjugated diolefin having from 4 to 8 carbon atoms. Such copolymers and their preparation are well known, and generally the isoolefin is a compound such as isobutylene and the diolefin is a compound such as butadiene or isoprene. Halogenated butyl rubber is also well known; chlorinated and brominated butyl rubber generally contain at least about 0.5 weight percent combined halogen and up to about 1 atom of halogen per double bond in the copolymer; chlorobrominated butyl rubber generally contains from about 1.0 to about 3.0 weight percent bromine and from about 0.05 to about 0.5 weight percent chlorine.

The level of olefinic elastomer employed in the final blend composition is generally from about 10 to about 35 weight percent of the composition, preferably from about 12 to about 30 weight percent, most preferably about 14 to about 25 weight percent.

Mineral filler and/or carbon black filler is also used in the blend composition. The fillers are generally well known in the art and need not be described in detail herein. The preferred fillers, particularly where flame retardancy is an objective are the mineral fillers, and among those the hydrated aluminum oxides are particularly preferred, for example alumina trihydrate. The latter material releases water on heating for improved flame retardancy effectiveness. It is also well known that mineral fillers can be treated with a coupling agent for improved compatibility between the filler(s) and polymeric component(s). Preferred coupling agents include organosilicon and titanium derivatives such as silanes and titanates and the improved compatibility can be accomplished by treating the fillers independently of the blend and then using them or by incorporating a coupling agent in the blend composition for in situ treatment.

Examples of silanes include dimethyldichlorosilane, methyl trichlorosilane, vinyl trichlorosilane, γ-methacryl-oxypropyltrimethoxysilane, N,N-bis(β-hydroxyethyl)γ-amine-propyl-triethoxy silane, vinyl propyl-trimethoxysilane, γ-methacryloxy-propyl-trimethoxy silane, γ-mercaptopropyltrimethoxy silane, vinyl trimethoxy silane, γ-glycidoxy propyl trimethoxysilane, β-(3,4-epoxy-cyclohexyl)ethyl trimethyl silane, and vinyl trimethoxyethoxysilane. (The latter material is available commercially as A-172 Silane.)

Examles of titanates and other organo-titanium derivatives useful as coupling agents include tetraisooctyl titanate, isopropyl diisostearyl methacryl titanate, isopropyltriisostearoyl titanate, isopropyl-triacryl titanate, titanium di-(dioctyl pyrophosphate) and especially the so-called hybrid titanates such as isopropyl dimethacryl isostearoyl titanate. Additional suitable titanium compounds are described in S. J. Monte & G. Sugerman, J. Elastomers & Plastics Volume 8 (1976) pages 30–49, incorporated herein by reference. The weight ratio of coupling agent to filler is in the range of 0.05 to 0.1:1 respectively; preferably 0.01 to 0.05:1 respectively.

Examples of mineral fillers include silane treated calcined clay (e.g., Burgess ® KE Clay), calcined kaolin clay (dehydroxylated aluminum silicate, e.g., Whitetex ®), hydrated aluminum oxides, ammonium or sodium dawsonite, hydrated magnesia and hydrated calcium silicate, especially alumina trihydrates.

The compositions can be produced in a conventional manner, e.g., by blending the components in high shear mixers such as a Banbury mixer, twin screw extruder or Farrell Continuous Mixer. The objective is to achieve a fine, uniform dispersion of the ingredients by inducing sufficient shear and heat to cause the plastics component(s) to melt and the rubber to be broken down. Typically, the rubber would be added first and mixed for a short time, e.g., 30 sec. to 1 min., then the remaining ingredients would be added and mixing continued, e.g., for 5 minutes, reaching a temperature on the order of 175° C., i.e., above the melting point of the polyolefin plastics. After mixing the composition can be underwater pelletized for convenient handling. Time and temperature of mixing should be controlled as is normally done by one skilled in the art so as to avoid molecular weight degradation and unnecessary oil volatilization and chemical breakdown. Depending on the polyolefin plastics component(s) employed, a temperature range of about 130° C. to 290° C. could be expected.

A hydrocarbon oil can optionally be incorporated into the thermoplastic elastomeric blend composition. The hydrocarbon oils which can be used include aromatic, naphthenic and paraffinic types, as well as a white mineral oil (a petroleum hydrocarbon oil). The level of hydrocarbon oil employed in the final blend composition is generally from about 0 to about 20 weight percent of the composition, preferably from about 0 to about 15 weight percent.

In addition to the essential ingredients of the overall thermoplastic elastomeric composition (as previously defined) as well as the optional use of hydrocarbon oil; various optional ingredients can be incorporated into the composition in order to achieve various cost and/or performance objectives. For example, one can use such materials as process aids (e.g., stearic acid and stearates such as calcium stearate), antioxidants and pigments.

Insulated conductors produced according to the invention disclosed herein are particularly useful in high quality, low voltage applications, e.g., 600 volts to 5,000 volts. The compositions can be used in extruded or molded electrical applications where a demanding set of physical and heat aging properties are required. Those compositions utilizing a mineral filler which releases water on heating, and particularly those which do not have oil incorporated in the blend are particularly well suited to applications where flame retardancy is important. For example, the insulated conductors disclosed herein are useful in building wire and communication wire, particularly when used in conduits.

The scope and significance of the present invention may be more fully understood with reference to the following specific examples thereof.

EXAMPLE 1

A composition typical of that utilized in the insulated conductor of this invention is shown in Table 1.

TABLE 1

| Component | WT. % |
|---|---|
| Ethylene propylene terpolymer, EPDM (Vistalon ® 3708) | 18 |
| Polypropylene (PD-064, 0.8 melt flow rate) | 25 |
| Ethylene vinyl acetate, EVA (XQ-92, 27% vinyl acetate, 3 melt index) | 28 |
| Silane treated calcined clay (Burgess ® KE) | 21.5 |
| Paraffinic oil (Sunpar ® 2280) | 5.0 |
| Stabilizers (Irganox ® 1010, and dilauryldithiopropionate, DLDTP) | 1.0 and 0.5 |
| Properties | |
| Melt Flow Rate @ 230° C., g/10 min. | 3.2 |
| Hardness, Shore A | 94 |
| Tensile Strength, psi | 1730 |
| Elongation, % | 440 |
| Flexural Secant Modulus, psi | 26,100 |
| Aged Properties (7 days @ 150° C.) | |
| % Tensile Retained | 119 |
| % Elongation Retained | 77 |

The compositions of the examples were prepared by mixing in an internal mixer, i.e., a Banbury mixer. Initially the rubber is added and heated and masticated for approximately 30 seconds; the filler(s) oil (if any), plastics and stabilizers are then added. Mixing is continued for approximately 5 minutes and the mixed composition reaches a temperature of approximately 350° F. It is also feasible to blend the elastomer with a portion of the other ingredients for subsequent use as a masterbatch with improved dispersion.

EXAMPLE 2

It was found that a chemical coupling agent used in combination with filler or more preferably a pretreated filler promotes bonding between the filler and polymer which leads to improved heat aging properties. Table II compares two similar thermoplastic compounds, one contains stearic acid, a commonly used process aid while the other contains a vinyl silane coupling agent. The vinyl silane reduces the initial elongation from 700% to 435%, which is desirable for these insulation materials, and increases the elongation retention after heat aging from 32% to 51%.

TABLE II

| Component | 1 | 2 |
|---|---|---|
| EPDM (Vistalon 3708) | 16 | 16 |
| Polypropylene | 30 | 30 |
| EVA (18% VA) | 24.5 | 24.5 |

TABLE II-continued

| Component | 1 | 2 |
|---|---|---|
| Paraffinic Oil | 6.5 | 6.5 |
| (Sunpar 2280) | | |
| Calcined Clay | 20.7 | 20.7 |
| (Whitetex ® Clay) | | |
| Stabilizer | 1.5 | 1.5 |
| (Agerite ® MA) | | |
| Stearic Acid | 0.8 | — |
| Vinyl silane | — | 0.8 |
| (A-172 Drimix ® (75%))[1] | | |
| Electrical Properties | | |
| (ASTM D-150) | | |
| Dielectric Constant | 2.86 | 2.92 |
| % Power Factor | 0.25 | 0.31 |
| Original Physical Properties | | |
| Tensile Strength, psi | 1770 | 1660 |
| Elongation, % | 700 | 435 |
| Heat Aged Physical Properties | | |
| (7 days/150° C.) | | |
| % Tensile Retained | 119 | 127 |
| % Elongation Retained | 32 | 51 |

[1] vinyl-tris (β-methoxyethoxy) silane.

EXAMPLE 3

The use of a pretreated filler in these thermoplastic blends, such as a calcined clay containing a functional surface silane treatment (e.g. Burgess KE), further enhances the heat aged properties. Table III shows the use of this mineral filler in compounds containing different concentrations of process oil. The first composition has a good balance of original physical properties (1850 psi tensile and 300% elongation) and retained 95% of its original elongation after air oven aging for 7 days at 150° C. The further addition of oil is useful in increasing compound flexibility.

TABLE III

| Composition | 1 | 2 | 3 |
|---|---|---|---|
| EPDM (VISTALON 3708) | 20 | 18 | 16 |
| Polypropylene (PD-064) | 26 | 25 | 24 |
| EVA (UE-645; 28% VA) | 30 | 28 | 26 |
| Silane treated mineral filler (Burgess KE Clay) | 21.5 | 21.5 | 21.5 |
| Paraffinic Oil (Sunpar 2280) | 0 | 5 | 10 |
| Irganox 1010 | 1 | 1 | 1 |
| DLDTP | 0.5 | 0.5 | 0.5 |
| Melt Flow Rate @ 230° C., g/10 min. | 2.4 | 3.2 | 5.1 |
| Physical Properties | | | |
| Shore A Hardness | 95 | 94 | 94 |
| Tensile Strength, psi | 1850 | 1730 | 1600 |
| Elongation, % | 300 | 440 | 510 |
| Secant Flex. Mod., psi | 32000 | 26100 | 21500 |
| Aged Physical Properties (7 days/150° C.) | | | |
| % Tensile Retained | 121 | 119 | 119 |
| % Elongation Retained | 95 | 77 | 73 |

EXAMPLE 4

Improved insulated substrates are also produced using alumina trihydrate filler for enhanced flame retardant properties. Prior art materials such as polyvinyl chloride-containing insulation are limited because of the toxic and corrosive HCl fumes which evolve during a fire. Table IV illustrates three thermoplastic compositions useful for insulating a conductive substrate.

TABLE IV

| Composition | 1 | 2 | 3 |
|---|---|---|---|
| EPDM (Vistalon 3708) | 18 | 20 | 16 |
| Polypropylene (PD 064) | 25 | 26 | 14 |
| EVA (UE 645; 28% VA) | 28 | 30 | — |
| EVA (XQ 92.36; 27% VA) | — | — | 15.5 |
| Alumina trihydrate (Hydral ® 710) | 21.5 | 21.5 | 53 |
| Paraffinic oil (Sunpar 2280) | 5 | — | — |
| Vinyl silane (A-172 Drimix) | 1 | 1 | — |
| Irganox 1010 | 1 | 1 | 1 |
| DLDTP | 0.5 | 0.5 | 0.5 |
| Melt Flow Rate @ 230° C., g/10 min. | 4.0 | 2.9 | — |
| Melt Index @ 190° C. | — | — | 0.24 |
| Physical Properties | | | |
| Shore A Hardness | 94 | 94 | 95 |
| Tensile Strength, psi | 1850 | 1850 | 1800 |
| Elongation, % | 800 | 425 | 100 |
| Flexural Secant Modulus, psi. | 28000 | 37000 | 24000 |
| Aged Physical Properties (7 days @ 150° C.) | | | |
| % Tensile Retained | 105 | 116 | 135 |
| % Elongation Retained | 50 | 79 | 75 |

Composition 3 is particularly well suited to flame retardancy; it results in an oxygen index of 27–28 indicating that high levels of oxygen are required to effect burning of the composition.

The compositions employed as insulating layers in this invention are particularly well suited to production as a stable pellet form which is useful for manufacturing purposes.

What is claimed is:

1. In an insulated, electrically conductive substrate the improvement comprising the use, as the insulation, of a nonvulcanized, thermoplastic elastomeric blend composition comprising (a) polypropylene reactor copolymer, polybutylene, or mixtures thereof, and (b) copolymer of ethylene and an unsaturated ester of a lower carboxylic acid, and (c) olefinic elastomer, and (d) a mineral filler or carbon black filler or mixtures thereof, and, optionally, a hydrocarbon process oil, wherein said olefinic elastomer is selected from the group consisting of ethylene copolymer elastomers and ethylene terpolymer elastomers containing between about 50 and about 70 weight percent ethylene, polyisobutylene, isobutylene-isoprene copolymers elastomers and halogenated isobutylene-isoprene copolymer elastomers.

2. The insulation of claim 1 wherein said ethylene copolymer elastomer comprises a copolymer of ethylene and propylene.

3. The insulation of claim 2 wherein said ethylene terpolymer elastomer comprises a terpolymer of ethylene, propylene and a nonconjugated diene.

4. The insulation of claim 1 wherein said unsaturated ester of a lower carboxylic acid is selected from the group consisting of vinyl esters and alkyl acrylates.

5. The insulation of claim 4 wherein said vinyl ester comprises vinyl acetate.

6. The insulation of claim 4 wherein said alkyl acrylate is selected from the group consisting of methyl acrylate and ethyl acrylate.

7. The insulation of claim 1 wherein said hydrocarbon oil is selected from the group consisting of paraffinic, naphthenic and aromatic oils.

8. The insulation of claim 1 wherein said polypropylene reactor copolymer includes ehtylene from about 1 to about 20 weight percent.

9. The insulation of claim 1 wherein said mineral filler is further treated, either before or after incorporation in said insulation, with an effective amount of a coupling agent.

10. The insulation of claim 1 including from about 10 to about 40 weight percent of said polypropylene or propylene reactor copolymer.

11. The insulation of claim 1 including from about 10 to about 35 weight percent of said copolymer of ethylene.

12. The insulation of claim 1 including from about 10 to about 35 weight percent olefinic elastomer.

13. The insulation of claim 1 including from about 15 to about 75 percent filler.

14. The insulated, electrically conductive substrate of claim 1 selected from the group consisting of building wire and communication wire.

* * * * *